United States Patent [19] [11] 4,120,467
Stephenson [45] Oct. 17, 1978

[54] COMFORT MECHANISM FOR SEAT BELT RETRACTOR

[75] Inventor: Robert Larry Stephenson, Sterling Heights, Mich.

[73] Assignee: Allied Chemical Corporation, Morris Township, Morris County, N.J.

[21] Appl. No.: 791,617

[22] Filed: Apr. 27, 1977

[51] Int. Cl.² .............................................. B65H 75/48
[52] U.S. Cl. .............................. 242/107; 242/107.4 R;
A62B/35/02
[58] Field of Search ............................ 242/107–107.7;
280/744–747; 297/388

[56] References Cited
U.S. PATENT DOCUMENTS 3,957,222  5/1976  Bladh ........................ 242/107.4 R X
3,984,063 10/1976  Knieriemen ............... 242/107.4 R X
4,026,494  5/1977  Tanaka ....................... 242/107.4 R X

FOREIGN PATENT DOCUMENTS 2,606,293  9/1976  Fed. Rep. of Germany ........... 242/107

Primary Examiner—Harvey C. Hornsby
Assistant Examiner—John M. Jillions
Attorney, Agent, or Firm—Roger H. Criss; Patrick L. Henry

[57] ABSTRACT

In accordance with this invention, there is provided a safety belt retractor comprising a frame, a spool mounted for rotation on the frame and having seat belt webbing wound thereon, first means biasing the spool in a rewind direction and means for reducing the tension of the webbing against the wearer due to the bias force of the first biasing means, the tension reducing means comprising a second means biasing the spool in a rewind direction and having a lower biasing force than the first biasing means, the tension reducing means being activated upon a retraction movement of a withdrawn seat belt followed by a slight further extension of the belt and a subsequent slight additional retraction of the belt from the further extended position, the tension reducing means operable when activated to block out the rewind bias of the first biasing means and permitting the second biasing means to apply its lesser rewind force to the spool. The tension reducing means preferably is automatically deactivated upon further retraction from the slight additional retraction position whereby the first biasing means is no longer blocked out and is permitted to exert its stronger rewind bias force to wind up the belt.

10 Claims, 7 Drawing Figures

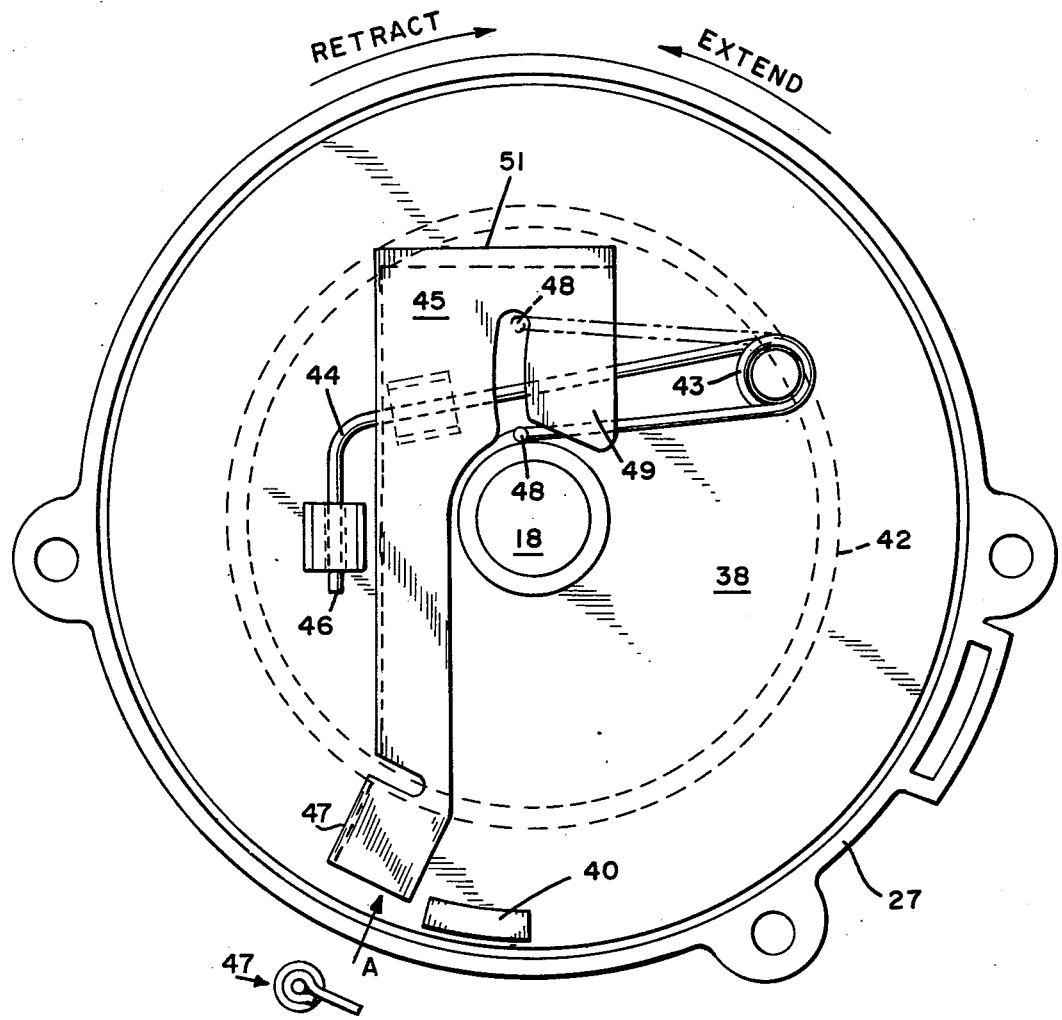
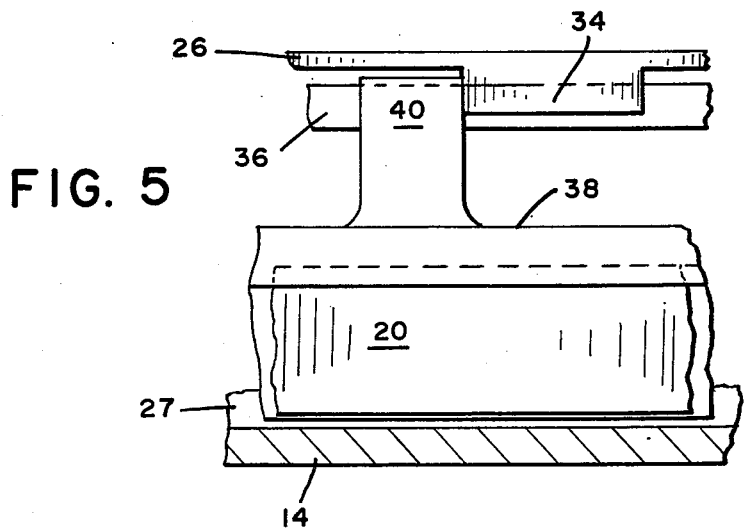

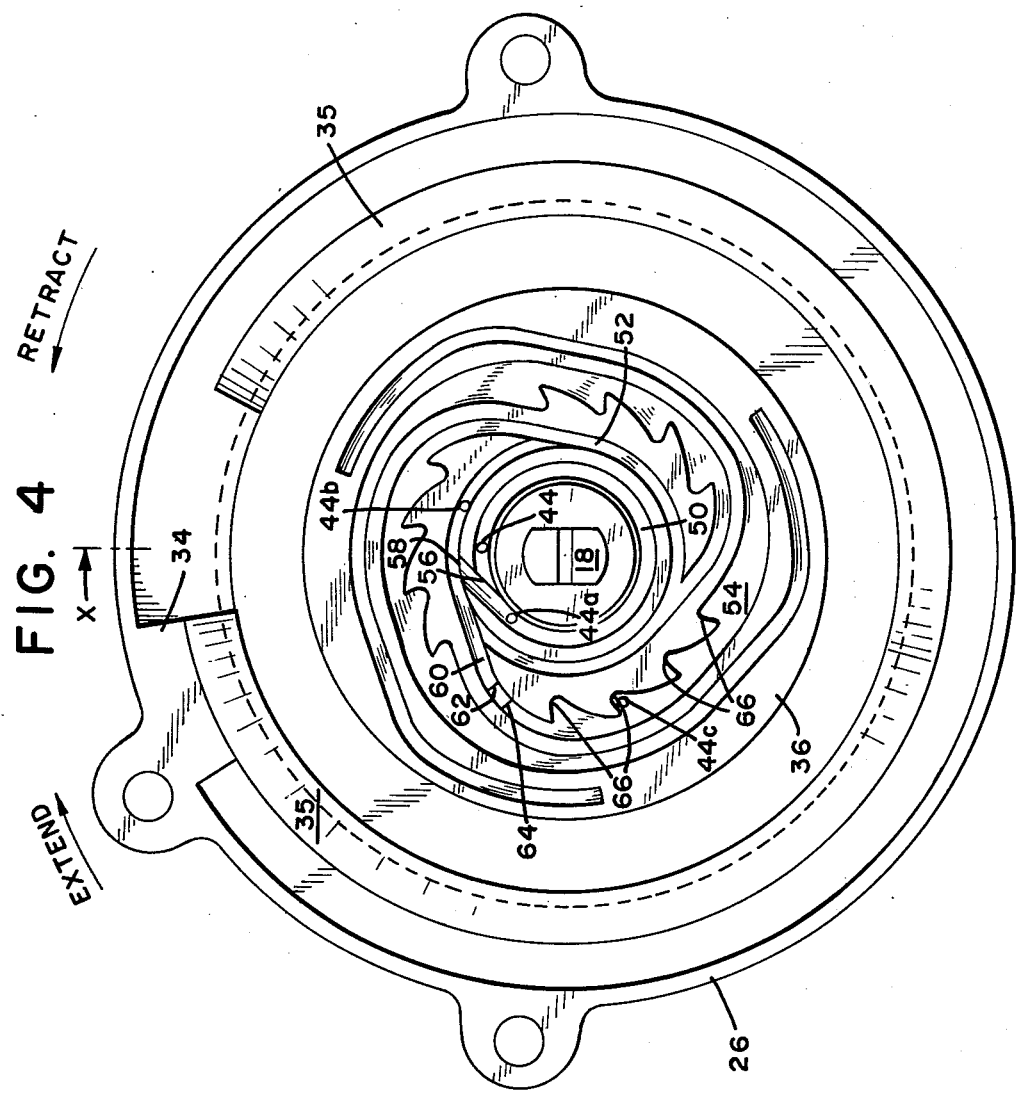
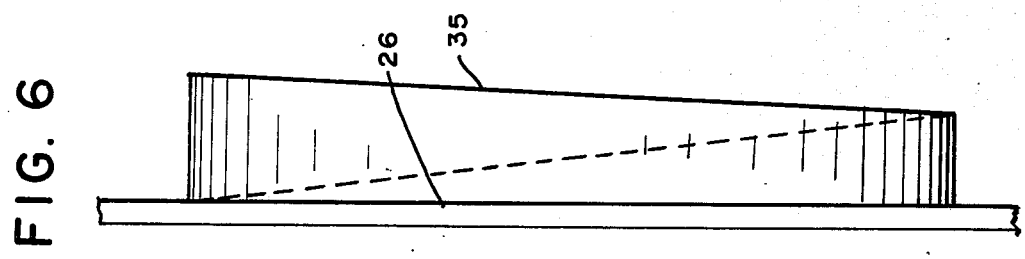

COMFORT MECHANISM FOR SEAT BELT RETRACTOR

BACKGROUND OF THE INVENTION

1. Field of the Invention

This invention relates to a comfort rewind mechanism for a seat belt retractor.

2. Description of the Prior Art

Seat belt retractors of the emergency locking type are designed to permit withdrawal of seat belt webbing against the bias of the rewind spring so that the belt may be buckled about the wearer. Such retractors permit further extension of the belt as well as retraction of the belt as the wearer moves about in his seat and are provided with a locking mechanism which prevents extension of the belt in emergency conditions, such as in the event of a sudden deceleration of the vehicle. The rewind springs of such retractors of necessity exert a substantial rewind force and it has been found that the pressure of the spring bias is uncomfortable to the wearer, especially in the shoulder area.

It has been suggested in several U.S. patents to provide a means of eliminating the tension exerted by the rewind spring. Exemplary of such patents are U.S. Pat. Re. No. 29,095 to Heath and U.S. Pat. No. 3,851,836 to Sprecher, U.S. Pat. No. 3,869,098 to Sprecher and U.S. Pat. No. 4,002,311 to Fisher et al. In each of these patents, means are provided which totally block out the force of the rewind spring after the belt is buckled about the user and then extended further and retracted from the extended position.

The prior comfort designs are of the so-called "tension elimination" design, that is, the rewind spring is blocked out when in use, and while providing improved comfort for the user, can be misused in that an excess amount of belt may remain about the user during operation of the vehicle. Moreover, such designs require a separate releasing mechanism to permit retraction of the seat belt. These mechanisms, such as a mechanical or solenoid door release, add cost and complexity to the comfort mechanism system.

It would be desirable if a comfort mechanism for a seat belt retractor were provided which alleviates the above-mentioned problems. One such device is that disclosed in co-filed application of Joseph Cachia, entitled "Comfort Mechanism for Seat Belt Retractor", Ser. No. 791,618, in which a series of comfort zones are provided by utilizing an additional rewind spring which exerts a lower rewind force when the main spring is blocked out. Such embodiments, however, provide high (and low) comfort zones at various predetermined positions of seat belt extension, and hence, the user must adjust his seating position accordingly if the comfort mechanism feature is desired to be utilized. It would be desirable if there were provided a comfort mechanism of the tension reducing type which was not restricted in use to such predetermined positions of comfort zones and also was self-releasing.

SUMMARY OF THE INVENTION

In accordance with this invention, there is provided a safety belt retractor comprising a frame, a spool mounted for rotation on the frame and having seat belt webbing wound thereon, first means biasing the spool in a rewind direction and means for reducing the tension of the webbing against the wearer due to the bias force of the first biasing means, the tension reducing means comprising a second means biasing the spool in a rewind direction and having a lower biasing force than the first biasing means, the tension reducing means being activated upon a retraction movement of a withdrawn seat belt followed by a slight further extension of the belt and a subsequent slight additional retraction of the belt from the further extended position, the tension reducing means operable when activated to block out the rewind bias of the first biasing means and permitting the second biasing means to apply its lesser rewind force to the spool. The tension reducing means preferably is automatically deactivated upon further retraction from the slight additional retraction position whereby the first biasing means is no longer blocked out and is permitted to exert its stronger rewind bias force to wind up the belt.

The tension reducing means preferably includes a rotatable cap member which is connected to the second biasing means, a rotatable disc-shaped plate having a series of grooves and a follower member operable to connect the cap member and the plate as a single unit upon the subsequent slight additional retraction of the belt to block out the first biasing means and thus permitting the second biasing means to exert its lesser rewind force and take up any slack in the belt.

BRIEF DESCRIPTION OF THE DRAWINGS

FIG. 3 is a cross-sectional view in the direction of arrow Y in FIG. 2.

FIG. 3A is a partial cross-sectional view in the direction of arrow A in FIG. 3 showing the contact portion of the follower arm.

FIG. 4 is a cross-sectional view in the direction of arrow W of FIG. 2.

FIG. 5 is a view in the direction of arrow Z of FIG. 1 with the members in the stop configuration.

FIG. 6 is a partial cross-sectional view along arrow X of FIG. 4 showing the cover ramp.

DESCRIPTION OF THE PREFERRED EMBODIMENTS

Figure 1:
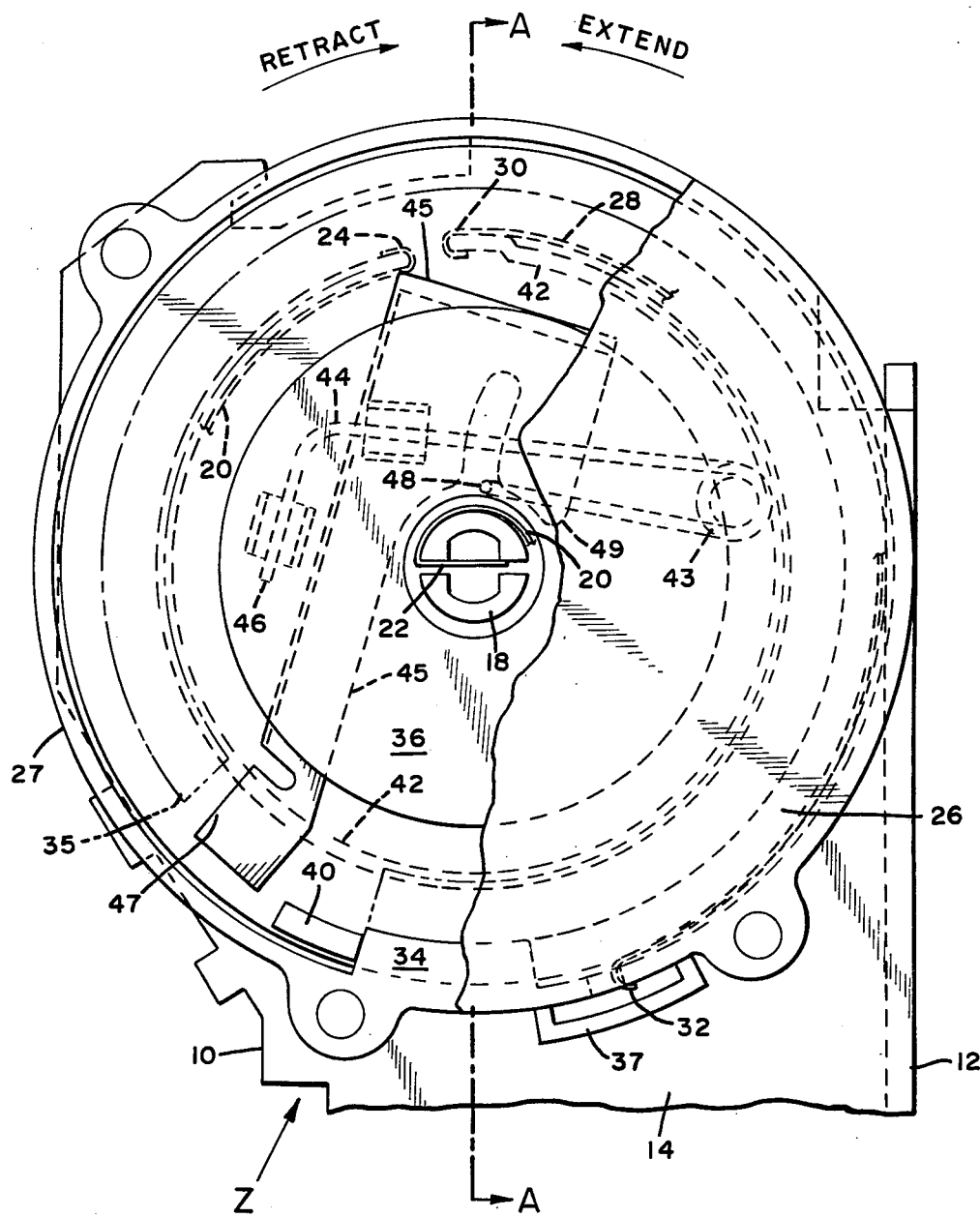
FIG. 1 is a broken side elevation view of the retractor of this invention.

The safety belt retractor may be of any of the known emergency locking retractor designs such as, for example, that shown in U.S. Pat. No. 3,838,831 to Bell, the disclosure of which is expressly incorporated herein by reference. The retractor, generally indicated at 10, has a general U-shape and includes a frame 12 having two end flanges 14. Retractor 10 is typically mounted in the vehicle, such as on an interior vehicle pillar, so that the belting may extend over the shoulder and across the lap of the wearer, with the free end of the belt being latched in the usual manner. Supported for rotation in frame 12 is spool 16 mounted on shaft 18 and provided with seat belt webbing (not shown). Also supported on the shaft is a ratchet wheel and an associated emergency locking device such as a pendulum-actuated latch (also not shown). As usual, one end of the webbing is retained in the spool and the other end is affixed to a belt tongue which is adapted to lock with a seat belt buckle.

Main rewind spiral spring 20 of conventional configuration has one end 22 attached to shaft 18 and the other end 24 affixed to spring cup 38 at a location which is slightly radially inward from its periphery. Comfort spiral spring 28 is circumferentially spaced from the main rewind spring and has one end 30 affixed to the spring cup 38 at a location adjacent to end 24 of rewind spring 20 and the other end 32 to a portion 37 of a housing 27 adjacent its periphery.

Figure 2:
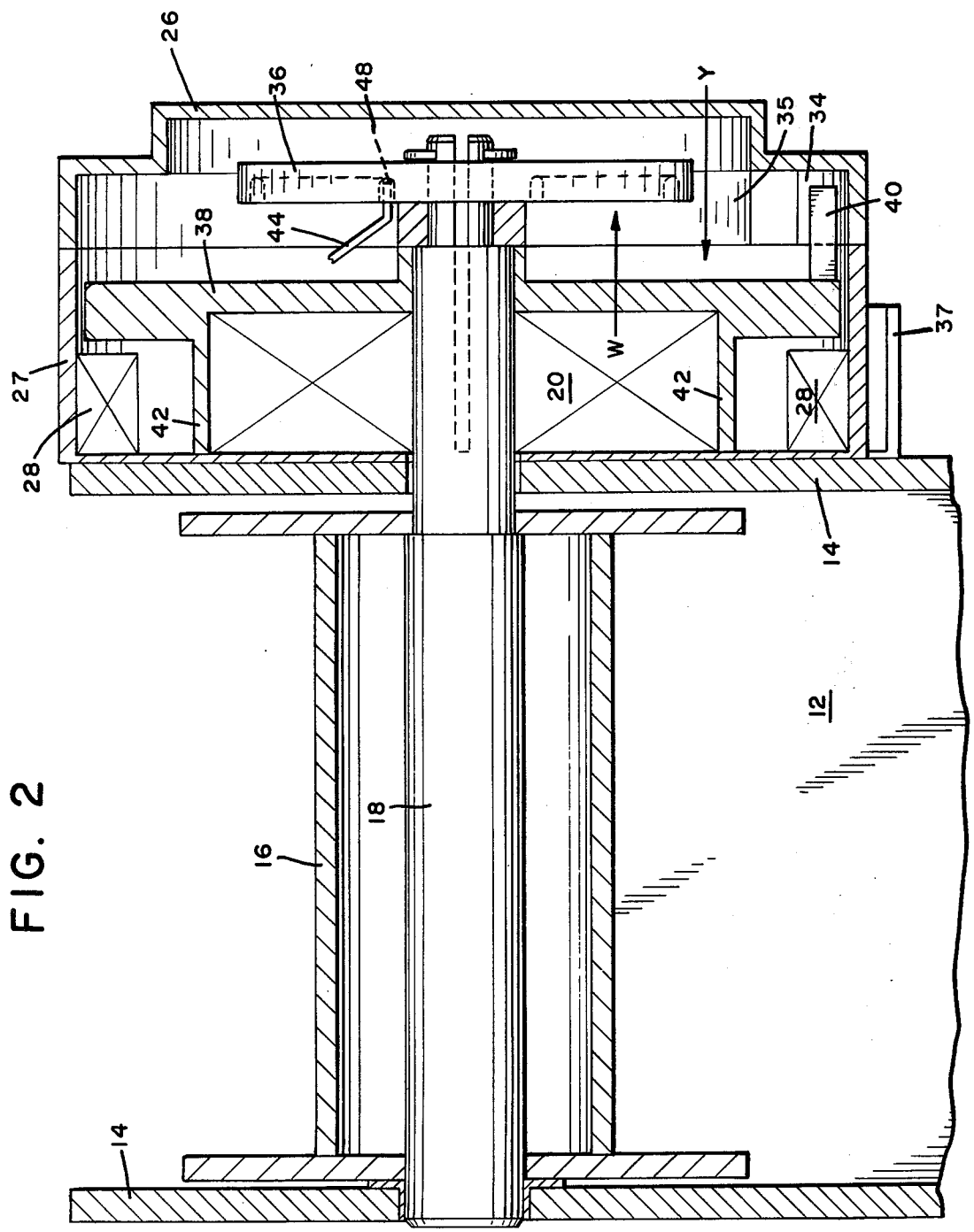
FIG. 2 is a cross-sectional view along line A—A of FIG. 1.

As is usual, cover 26 is formed from a synthetic plastic material and is affixed to the end flange 14 through housing 27 by suitable fastening means. The interior surface of cover 26 is formed with an integral stop 34 to limit rotation of the spring cup 38. The interior portion of cover 26 also supports a circular ramp or cam rise 35 which slopes upwardly in the axially outward direction of FIG. 2 and inwardly in the clockwise direction of FIG. 1. Scroll plate 36, also suitably formed of plastic material, is journalled to shaft 18 for rotation therewith at a location adjacent to the inner face of cover 26. Scroll plate 36 is formed with a series of grooves as is more particularly described below. Located axially outward from rewind spring 20 is a spring cup 38, also suitably formed from a plastic material, which is likewise journalled for rotation on shaft 18. Spring cup 38 is formed with an integral stop portion 40 which faces axially outward and which is adapted to engage with stop 34 on cover 26. Spring cup 38 has a flange portion 42 which surrounds rewind spring 20 and is attached thereto. Supported on the axially outward face of spring cup 38 is a spring follower 44 which has one end 46 suitably anchored to spring cup 38 and the other end 48, which is provided with a sharp (e.g., 90°) bend, is received in the grooves of the scroll plate. An intermediate portion 43 of follower 44 is pivoted to spring cup 38 via a pin. A spring follower arm 45 is pivotally mounted via pin 51 on spring cup 38 and pivots in a plane which intersects the plane of the radially outwardly extending face of spring cup 38; that is, in a plane extending outwards from the face of the FIG. 3 drawing, which is the radially outward direction of FIG. 2 towards the face of scroll plate 36 that bears the grooves. Follower arm 45 includes a contact portion 47 at its end remote from the pivotal end. Contact portion 47 is shown in the form of a small roller mounted for rotation on a side edge of follower arm 45. Contact portion 47 is adapted to engage and ride on cam rise 35 of cover 26. Spring follower 44 is mounted such that its end 48 is both urged radially toward the center of scroll plate 36 and urged toward the face of the scroll plate.

Provided on the underside of release portion 49 of follower arm 45 is a release surface which is adapted to contact a portion of spring follower 44 between its end 48 and its intermediate portion 43 and depress spring follower 44 out of engagement with the grooves on scroll plate 36. End 48 projects through to scroll plate 36 through a slot in follower arm 45.

Scroll plate 36 (FIG. 4) is provided with a series of grooves in a manner similar to that shown in the aforementioned U.S. Pat. No. 4,002,311, to which reference is made. Three grooves 50, 52 and 54 are provided in the scroll plate. First groove 50 has a generally circular configuration and is located adjacent to the center of the scroll plate. One end 56 of groove 50 is in communication with second groove 52 and end 56 terminates in a shoulder 58. Second groove 52 is spaced radially outwardly from first groove 50 and communicates at its end 60 over ramp 62 and shoulder 64 with third groove 54 which is provided with a plurality of notches or hooks 66. Third groove 54 has a general spiral configuration. There are three third grooves 54 shown in the embodiment depicted, each of which is in communication with associated second groove 52 and first groove 50. However, the number of sets of grooves may vary. End 48 of spring follower 44 is received in and slidably engages the grooves of the scroll plate and is urged toward the bottom of the grooves. Spring follower 44 is shown in FIG. 4 in its initial position, that is, with the seat belt webbing fully rewound on the spool.

In operation, when the webbing is extended from the retractor from its fully wound up position for purposes of securing the belt around the wearer, scroll plate 36, which is journalled to shaft 18, rotates in a clockwise direction, that is, the extend direction in FIG. 4. Such extension also winds up main spring 20 in the same direction. During such rotation of the scroll plate, spring follower 44 is caused to move in first groove 50 of scroll plate 36 in a counter-clockwise direction as viewed in FIG. 4. Spring follower 44 drops into the area adjacent end 56 of groove 50 and continues to circulate in such groove during extension of the webbing. Spring cup 42 is held stationary due to the engagement of its stop 40 with stop 34 on cover 26. Upon full extension of the webbing, spring follower 44 is in groove 50 at, for example, the position indicated at 44a in FIG. 4. After latching the buckle and tongue sections of the seat belt assembly together, scroll plate 36 is rotated with shaft 18 in the counter-clockwise (rewind) direction due to the bias of rewind spring 20. The belt is then pressed against the shoulder and chest of the wearer. During such rewind operation, spring follower 44 is moved past end 56 of groove 50, over ramp 58 and into second groove 52 to position 44b. Thus, after the belt is fastened about the wearer, and excess webbing is automatically taken up by main rewind spring 20, the spring follower is in second groove 52 and the belt is snuggly against the wearer's shoulder, with, however, a considerable amount of tension.

In order to actuate the comfort mechanism of the present invention, the wearer extends the seat belt an additional slight amount. This causes a clockwise rotation of scroll plate 36 which in turn causes spring follower 44 to move over ramp 62 passed shoulder 64 and into third groove 54. As such extension continues, stop follower 44 is urged into a position behind one of the notches 66, for example, at position 44c. When the belt is released from this slightly further extended position, spring follower 44 catches on the closest of the notches 66. As a result, scroll plate 36 is tied through spring follower 44 to spring cup 38 and the bias of rewind spring 20 is blocked out. However, the lighter comfort spring 28 is now permitted to exert a lesser retracting force on shaft 18, and hence, against the wearer's shoulder. The bias of comfort spring 28 causes rotation of stop 40 on spring cup 38 in the rewind direction away from stop 34 on cover 26. Since scroll plate 36, spring follower 44 and spring cup 38 are tied together, the scroll plate is also rotated in the rewind direction. As a result, the comfort spring winds up the excess belt to a snug, but comfortable, fit against the wearer's shoulder.

When the seat belt buckle is released, comfort spring 28 rotates spring cup 38 and scroll plate 36 as a unit for less than one revolution. During such rotation, contact portion 47 of spring follower arm 45 is riding up ramp 35 of cover 26. Also, the underside of release portion 49 of follower arm 45 is in contact with intermediate portion 43 of spring follower 44. Rotation of spring cup 38 and scroll plate 36 as a unit continues until contact portion 47 has moved up ramp 35 a predetermined distance such that release portion 49 depresses spring follower 44 to such an extent that spring follower 44 is moved away from and out of the grooves on scroll plate 36 (that is, in the direction of spring cup 38). Due to its radially inward bias, spring follower 44 is automatically returned to first groove 50 on scroll plate 36. Since scroll plate 36 is no longer tied to spring cup 38, main rewind spring 20 is no longer prevented from exerting its rewind bias on shaft 28 and it retracts the webbing to spool 16 with a high retraction force. Also, scroll plate 36 and spring cup 38 are rotated to their original position.

From the buckled condition, the wearer can lean forward and backwards in relative comfort. Forward movement resulting in further extension of the webbing causes scroll plate 36 to rotate in the clockwise direction, which causes spring follower 44 to move away from its engagement with notch 66 and further along third groove 54. If such forward motion is limited, spring follower 44 will move into position behind of the notches 66 more outwardly spaced in groove 54. Retraction from such further extended position will cause spring follower 44 to again be caught on a notch 66 and thus continue to block out rewind spring 20. However, extension of the belt beyond such limited amount causes spring follower 44 to move along the extent of third groove 54 to a position where its intermediate portion 43 is contacted by the underside of release portion 49 of follower arm 45 and is moved out of the grooves of the scroll plate at which time spring follower 44 is snapped radially inwardly to its initial position, thereby deactivating the comfort mechanism. The main rewind spring 20 will then exert its relatively high retraction force on the belt. However, the comfort mechanism can be reactivated by extending and releasing the seat belt once again.

Also, with the webbing in place about the wearer and the comfort mechanism activated, rearward movement by the wearer results in a rotation of spring cup 38 and scroll plate 36 as a unit for a limited amount of rewinding, during which time the lighter comfort spring is exerting its biasing force. A large rearward movement of the wearer will, however, rotate the unit until contact portion 47 of spring follower arm 45 is moved to an extent such that spring follower 44 is moved out of the scroll plate grooves, at which time the main rewind spring 20 is reactivated, as described above.

It can be seen that the present invention provides a comfort zone of reduced tension subsequent to a limited extension of a buckled seat belt followed by a slight additional retraction of the belt. The comfort zone is automatically activated upon such belt movement and, unlike previously suggested systems, may be activated at any position of the extended belt regardless of the amount of belt that has been withdrawn. The comfort mechanism permits the wearer to normally move about in his seat without deactivating the comfort mechanism and automatically is deactivated upon unbuckling of the seat belt, thereby eliminating the need for various mechanical or electrical door release mechanisms. Moreover, the comfort mechanism is totally apart from the emergency locking portion of the retractor and does not interfere with the latter's operation.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:
1. A safety belt retractor comprising a frame; a spool mounted for rotation on said frame and having seat belt webbing wound thereon; first means biasing said spool in a rewind direction; and means for reducing the tension of said belt against the wearer due to the bias force of said first biasing means, said tension reducing means comprising a second means biasing said spool in a rewind direction, said second biasing means having a lower biasing force than said first biasing means, means for activating said tension reducing means upon a retraction movement of a withdrawn seat belt followed by a slight further extension of said belt and a subsequent slight additional retraction of said belt from said further extended position, said activating means including means for blocking out the rewind bias of said first biasing means and permitting said second biasing means to apply its lesser rewind force to said spool.

2. The retractor of claim 1 including means for automatically deactivating said tension reducing means upon further retraction from said slight additional retraction position whereby said first biasing means is no longer blocked out and is permitted to exert its stronger rewind bias force to wind up said belt.

3. The retractor of claim 2 including a shaft mounted on said frame, said spool being mounted on said shaft and wherein said tension reducing means comprises a cup member rotatable on said shaft, said first biasing means being operatively connected between said shaft and said cup member a disc-shaped plate rotatable with said shaft and having a plurality of grooves on one face thereof and a follower member operatively connected to said cup member and resiliently urged into said grooves and operable upon said subsequent slight additional retraction to cause said cup member and said plate to rotate as a unit, whereby said first biasing means is blocked out.

4. The retractor of claim 3 wherein said cup member is connected to one end of said first biasing means and the other end of said first biasing means is connected to said shaft, and one end of said second biasing means is connected to said cup and the other end of said second biasing means is fixed with respect to the frame of said retractor.

5. The retractor of claim 3 including stop means on said cup member preventing rotation thereof in the extension direction.

6. The retractor of claim 5 including a cover for said comfort mechanism and stop means on said cover engageable with said stop means on said cup member for limiting said rotation of said cup member in the rewind direction.

7. The retraction of claim 3 wherein said deactivating means includes means for moving said follower member out of said grooves upon said further retraction from said slight additional retraction position to thereby deactivate said tension reducing means.

8. The retractor of claim 7 wherein said plate includes a first annular groove adapted to receive said follower member resiliently urged into said groove, a second annular groove in communication with said first groove and spaced radially outward thereof, said second groove adapted to receive said follower member upon initial retraction of an extended belt, and a third annular groove spaced radially outward from and in communication with said second groove to receive said follower member upon further limited extension of said belt, said third groove having stop means therein which is engageable upon release of said further limited extension to block out the rewind bias of said first biasing means.

9. The retractor of claim 8 wherein said moving means includes cam rise means on said cover, a follower arm having one end pivoted to said cup member and the other end adapted for movement on said cam rise means, said follower arm operatively connected to said follower member to move said follower member out of said grooves upon movement of said other end a predetermined amount along said cam rise means to thereby deactivate said tension reducing means.

10. The retractor of claim 9 wherein said follower member is biased radially inward and into said grooves and wherein upon movement out of said grooves due to the action of said follower arm, said follower member is returned to said first groove on said plate.

* * * * *